# 3,291,628
BITUMINOUS SLURRY SEAL
Rudolf A. Jimenez and Bob M. Gallaway, College Station, Tex., assignors to Texas A & M Research Foundation, College Station, Tex., a corporation of Texas
No Drawing. Filed May 14, 1964, Ser. No. 367,542
6 Claims. (Cl. 106—283)

The present invention relates to new and useful improvements in slurry seals, and more particularly, in slurry seal aggregates utilized in the road building industry. The present application is a continuation-in-part of our copending application, Serial No. 144,295, filed October 11, 1961, now abandoned.

In the road building industry it is known that certain surfaces in pavement structures require an asphaltic seal. The function of such a seal may be one or a combination of the following: to waterproof a surface; to bind loose surface material; to fill surface voids; to minimize the circulation of air into a surface; to improve riding and sound characteristics of a surface; to improve skid properties of a surface; and to delineate travel lanes on a pavement. These functions may be accomplished by employing flush, chip or slurry seals. The present invention is directed to improvements in slurry seals.

In general, a slurry seal is a mixture of fine aggregate and bituminous emulsion. Its primary use is to waterproof the surface of a pavement and to improve its riding properties. It is quite fluid to facilitate spreading and for the penetration of surface cracks. The emulsion employed in slurry seals is generally bitumen-water emulsion of the slow setting grade in which droplets of asphalt are covered with an emulsifying agent to keep the droplets from coalescing and to control the rate of break. The emulsion breaks when the droplets of asphalt join to form a continuous film. The breaking of an emulsion may be caused by chemical or physical means. It is essential that the emulsion in slurry seals must not break during mixing thereof since the spreading of the seal would be impaired.

The gradation or particle size distribution of the fine aggregate and its surface activity are of prime importance in preventing breaking of the emulsion. It is essential that the gradation of the aggregate be such to prevent segregation during the placing of the seal. The composition and surface activity of the aggregate will influence the rate of break of the emulsion.

The present invention is directed to a slurry seal in which the primary aggregate is composed of wet-bottom boiler slag, either alone or combined with fly-ash in the proportions set forth, combined with filler materials in amounts sufficient to overcome the problems of gradation and surface activity.

In certain areas of the United States, coal, including lignite, is burned in a system known as a "wet-bottom boiler" for the purpose of generating energy. Two products are obtained. These are fly-ash and slag. The mined coal is initially crushed to sizes between 6 and 8 inches. It may further be crushed to sizes generally between ¼ and ½ inch, should certain distillates, such as tar, be desired and then coked prior to burning. The burning of the coked coal produces two materials, which are fly-ash and slag. The fly-ash is a powdery material that may be collected by a precipitator at the smoke stack. The slag is formed by allowing the molten inorganic compounds (magma) to flow into a vat of water and be quenched, the thermal shock and cooling resulting in a shattered slag. These two materials, fly-ash and slag, can be collected separately or may be allowed to blend with one another at the size of storage.

The general gradation or particle size distribution of wet-bottom boiler slag is set forth in Table I.

TABLE I

| Sieve size: | Total percent passing |
|---|---|
| ⅜" | 95–100 |
| No. 4 | 90–100 |
| No. 8 | 50–90 |
| No. 16 | 20–50 |
| No. 30 | 5–15 |
| No. 50 | 0–7 |
| No. 100 | 0–5 |
| No. 200 | 0–2 |

The material is bright and black, very hard (Mohs' value greater than 6) and the composition is essentially the same as that of fly-ash, both of which are set forth in Table III.

The normal gradation of fly-ash is set forth in Table II.

TABLE II

| Sieve size: | Total percent passing |
|---|---|
| No. 8 | 100 |
| No. 16 | 95–100 |
| No. 30 | 92–99 |
| No. 50 | 90–97 |
| No. 100 | 85–90 |
| No. 200 | 70–85 |

As previously mentioned, the chemical composition of both slag and fly-ash are set forth in Table III.

TABLE III

| | Percent |
|---|---|
| Silicon dioxide ($SiO_2$) | 27–40 |
| Calcium Oxide (CaO) | 20–32 |
| Ferric Oxide ($Fe_2O_3$) | 6–15 |
| Aluminum Oxide ($Al_2O_3$) | 18–25 |
| Magnesium Oxide (MgO) | 1–3 |
| Alkalies ($Na_2O+K_2O$) | 0–2 |

As previously mentioned, wet-bottom boiler slag and fly-ash are produced in power plant units burning granulated coal. Such units exist in Texas, Indiana and other states. The gradation and composition of these materials are given within the limits in the above tables since they vary with deposists of coal and with burning conditions. Under certain methods of stockpiling, wet-bottom boiler slag and fly-ash are carried to a tailing-pond where they are blended. In other methods, they are stockpiled separately.

It has not been possible to successfully utilize wet-bottom boiler slag or a mixture of this slag with fly-ash for the aggregate in slurry seals. This is because the gradation or surface activity of the slag mixture is such that the emulsion breaks and segregation ordinarily occurs during the placing of the seal. The fly-ash is a high surface active material which causes the bituminous emulsion to break prematurely during construction. There are large quantities of wet-bottom slag and fly-ash available at very low cost. The present invention is directed to overcoming these problems by which slag and a mixture of slag and fly-ash can successfully and satisfactorily serve as the primary aggregate for slurry seals.

It is therefore an object of the present invention to provide a satisfactory aggregate for slurry seals which includes wet-bottom slag or a mixture of wet-bottom slag and fly-ash.

Yet a further object of the present invention is to provide a primary aggregate for a slurry seal comprised of wet-bottom slag alone or combined with fly-ash.

Other and further objects, advantages and features will appear from the description of the invention, given for the purpose of disclosure.

The above problems have been solved according to the present invention by the addition to slag, alone or combined with fly-ash, of from about 20% to about 40% by weight of an inert filler, such as fine sand or crusher screenings, of which 100% passes the No. 4 sieve and 95% to 100% passes the No. 30 sieve and which are classified as well graded, and when the primary aggregate is a mixture of slag and fly-ash, by limiting the fly-ash to not more than 10% of the slag. This results in an aggregate that is workable due to proper gradation and satisfactory dilution of the surface activity of the fly-ash. This results in mixtures which have been successfully placed and have given excellent service.

Once the aggregate portion of the slurry seal has been mixed, it is mixed with the emulsion, such as bitumen-water emulsion in the usual manner. Any suitable emulsion for this general purpose may be utilized and the aggregate and emulsion may be mixed in any desired manner.

Emulsions used in highway paving surfaces are composed primarily of a bituminous material, water and an emulsifying agent. The bituminous material may be asphalt, tar or resins obtained from petroleum or coal and the emulsifying agent may be a clay, soap like compound or organic like compounds such as fatty amines or quaternary ammonium salts and the like. The emulsifying agent used produces an ionic charge on the surface of the bituminous droplet being held in suspension that is either a positive charge (cationic) or negative charge (anionic). In general, emulsifying agents used for bituminous emulsions are of a proprietary nature. Typical compositions of bituminous emulsions is shown in the following table:

TABLE IV

| | Percent of bitumen/water combination |
|---|---|
| Bituminous material | 50–70 |
| Water | 50–30 |
| Emulsifying agent | 0.10–0.50 |
| Stabilizer | 0.10–1.50 |

Specifications for some such emulsions are ASTM D977–57 and Asphalt Institute specification SS–1 and SS–1H. Additional specifications for such emulsions are set forth in the 1958 Book of ASTM Standards, part 4, published by American Society for Testing Materials, 1916 Race Street, Philadelphia 3, Pennsylvania, at pages 769–770 setting forth the specifications in particular for SS–1.

The amount of emulsion to be used in the slurry seal depends on the characteristics of the aggregate and upon the residual asphalt content of the emulsion. At the present, for most emulsion available and used with slurry seal materials the amount used varies from about 9% to about 16% by weight of the total mixture, with a presently preferred amount of emulsion generally being of the order of about 12% of the total weight of the mixture.

The term "filler" as used in this application and in the claims means and includes a mineral aggregate or any material used for the purpose of furnishing a desired quantity of particle sizes to produce an aggregate blend of desirable gradation, but such filler will not cause a bituminous emulsion to break. Examples of such fillers are river sands, crusher fines, field sands, mineral powders and inert granulated organic or inorganic materials including plastics.

Any suitable emulsion stabilizer may be used. For example, casein, soybean flour, blood, calcium chloride and the like.

The following examples illustrate presently-preferred embodiments of the invention given by way of example for purposes of disclosure.

*Example I*

Slag of the gradation of Table I and composition of Table III was mixed with well graded fine river sand of which 100% passed the No. 4 sieve and 95% to 100% passed the No. 30 sieve and which was well graded, the sand constituting about 20% of the total weight of the slag-sand aggregate. The aggregate was then mixed with bitumen-water emulsions of the compositions of Table IV in the usual manner. The amounts of the emulsion used were 9%, 12% and 16% by weight of the total mixture.

*Example II*

This example is the same as Example I except that crusher screenings of the same gradation of the sand take the place of the sand.

*Example III*

This example is the same as Examples I and II except that the sand and crusher screenings are increased to constitute 40% of the total weight of the aggregate.

*Example IV*

This example is the same as Examples I, II and III except there is included up to 10% of the fly-ash of the gradation of Table II and the composition of Table III.

*Example V*

This example is the same as Examples I to IV, inclusive, except there is included a mixture of the sand and crusher screenings in the amounts of 20% and 40% by weight.

*Example VI*

This example is the same as Examples I to V, inclusive, except there is included field sand of the same particle sizes and amounts set forth for the fillers of these examples.

*Example VII*

This example is the same as Examples I to IV, inclusive, except that there are included a mineral powder, crusher fines from igneous, metamorphic and sedimentary rocks, calcium clay and shale fines, or an inert granular inorganic material, each for the fillers of Examples I–IV, in the same particle sizes and amounts set forth.

*Example VIII*

In this example an inert granulated inorganic material, asbestos, in the same particle sizes and amounts takes the place of the fillers in the aggregates of Examples I–V, inclusive.

*Example IX*

In this example an organic material, powdered rubber, sawdust, bagasse, cork, each takes the place of the fillers of Examples I–V in the same particle sizes and amounts set forth.

*Example X*

In this example a plastic filler, pellets of polystyrene and polyethylene, each take the place of the fillers in Examples I–V in the same particle sizes and amounts set forth.

*Example XI*

In this example the emulsion of Example I is stabilized with from 0.10% casein to 0.30% casein, of the bitumen-water combination. Also, soybean flour, cattle blood and calcium chloride in these amounts take the place of casein.

In all of the above examples satisfactory slurry seal mixtures are produced having the required and desired qualities and characteristics.

The present invention, therefore, is well suited and adapted to carry out the objects and attain the ends and advantages mentioned as well as others inherent therein.

While presently-preferred embodiments and examples of the invention have been given for the purpose of disclosure, changes may be made therein which are within the spirit of the invention as defined by the scope of the appended claims.

What is claimed is:

1. A slurry seal mixture consisting essentially of a bituminous emulsion thoroughly incorporated with a mixture of from about 60% to about 80% by weight of wet-bottom boiler slag in which 100% is capable of passing through a 3/8 inch sieve and not more than about 2% is capable of passing through a No. 200 sieve and from about 20% to about 40% by weight of filler of which 95% to 100% is capable of passing through a No. 30 sieve, the emulsion comprising from about 9% to about 16% by weight of the total slurry seal mixture.

2. The slurry seal mixture of claim 1 where the emulsion comprises about 12% by weight of the total slurry seal mixture.

3. A slurry seal mixture consisting essentially of a bituminous emulsion thoroughly incorporated with an aggregate comprised of from about 60% to about 80% by weight of a mixture of a wet-bottom boiler slag of which 100% is capable of passing through a 3/8 inch sieve and not more than about 2% is capable of passing through a No. 200 sieve, and up to about 10% by weight fly-ash with respect to the slag of which about 70% is capable of passing through a No. 200 sieve, and from about 20% to about 40% by weight of filler of which 95% to 100% is capable of passing through a No. 30 sieve, said emulsion comprising from about 9% to about 16% by weight of the total slurry seal mixture.

4. The slurry seal mixture of claim 3 where the emulsion comprises about 12% by weight of the total slurry seal mixture.

5. An aggregate for a slurry seal comprising, 60% to 80% by weight of wet-bottom boiler slag of which 100% is capable of passing through a 3/8 inch sieve and not more than about 2% is capable of passing through a No. 200 sieve, and from about 20% to about 40% by weight of filler of which 95% to 100% is capable of passing through a No. 30 sieve.

6. An aggregate for a slurry seal comprising, 60% to 80% wet-bottom boiler slag in which 100% is capable of passing through a 3/8 inch sieve and not more than about 2% is capable of passing through a No. 200 sieve, and up to about 10% by weight fly-ash with respect to the slag of which about 70% is capable of passing through a No. 200 sieve, and from about 20% to about 40% by weight of filler of which 95% to 100% is capable of passing through a No. 30 sieve.

References Cited by the Examiner

UNITED STATES PATENTS

| | | | |
|---|---|---|---|
| 2,733,159 | 1/1956 | Scoggin et al. | 106—283 XR |
| 2,738,287 | 3/1956 | Eisenhut et al. | 106—283 XR |
| 2,760,878 | 8/1956 | Lhorty | 106—277 XR |
| 2,773,777 | 12/1956 | Alexander et al. | 106—281 XR |
| 2,909,440 | 10/1959 | Cobb | 106—283 XR |
| 3,059,455 | 10/1962 | McNally | 264—212 XR |
| 3,128,997 | 4/1964 | Young | 259—161 |
| 3,206,174 | 9/1965 | Young | 106—283 XR |

MORRIS LIEBMAN, *Examiner.*

J. B. EVANS, *Assistant Examiner.*